United States Patent [19]
Shiozaki et al.

[11] Patent Number: 5,884,599
[45] Date of Patent: Mar. 23, 1999

[54] ENGINE WITH BALANCERS FOR VEHICLE

[75] Inventors: Eiko Shiozaki; Atsushi Ogasawara; Sakae Mizumura; Takashi Matsuda, all of Saitama, Japan

[73] Assignee: Honda Giken Kogyo Kabushiki Kaisha, Tokyo, Japan

[21] Appl. No.: 887,935

[22] Filed: Jul. 3, 1997

[30] Foreign Application Priority Data

Jul. 3, 1996  [JP]  Japan ................................ 8-173531

[51] Int. Cl.[6] .......................... F16F 15/26; F02B 75/06
[52] U.S. Cl. ........................................ 123/192.2; 74/603
[58] Field of Search .......................... 123/192.1, 192.2; 74/603, 604

[56] References Cited

U.S. PATENT DOCUMENTS

| | | | |
|---|---|---|---|
| 5,038,731 | 8/1991 | Shimada | 123/192.2 |
| 5,044,333 | 9/1991 | Fuchigami et al. | 123/192.2 |
| 5,065,644 | 11/1991 | Shimada | 123/192.2 |
| 5,537,968 | 7/1996 | Takahashi | 123/192.2 |

FOREIGN PATENT DOCUMENTS

A4-277349  10/1992  Japan.

*Primary Examiner*—Weilun Lo
*Attorney, Agent, or Firm*—Birch, Stewart, Kolasch & Birch, LLP

[57] ABSTRACT

A starter motor and balancers are disposed reasonably so as not to interfere with each other by effectively utilizing spaces in an engine. Cylinders are set so as to be tilted forward on casings supporting a crankshaft in a transverse position, a rear balancer and a starter motor are disposed in a space behind the cylinders, and a front balancer is disposed on an opposite side of the rear balancer with respect to the crankshaft. The rear balancer and the front balancer are disposed on the right side of a plane including the center of gravity of the engine and perpendicular to the crankshaft, and the starter motor is disposed on the left side of the plane. Weight portions included in the rear balancer and the front balancer are disposed close to the plane to prevent coupling vibrations.

9 Claims, 9 Drawing Sheets

5,884,599

ENGINE WITH BALANCERS FOR VEHICLE

BACKGROUND OF THE INVENTION

1. Field of the Invention

The present invention relates to an engine with balancers for a vehicle wherein cylinders are set so as to be tilted forward on casings supporting a crankshaft disposed transversely of a body. A rear balancer is disposed in a space behind the cylinders. A front balancer is disposed on an opposite side of the rear balancer with respect to the crankshaft.

2. Description of Background Art

An engine with balancers for a vehicle is disclosed in, for example, Japanese Patent Laid-open No. Hei 4-277349. In this related art engine, a starter motor for starting the engine is disposed under the front end of a casing. In a motorcycle, exhaust pipes extend forward from the cylinder heads of the engine, and then the exhaust pipes are curved downwardly and rearwardly so as to extend under the front portion of the casing. Therefore, if the starter motor is disposed under the front end of the casing, the starter motor will interfere with the exhaust pipes and the exhaust pipes cannot properly be arranged. The starter motor may be disposed in a space behind the cylinders set on the casing so as to be tilted forwardly. However, the starter motor must be disposed in that space so as not to interfere with balancers disposed in that space.

SUMMARY AND OBJECTIONS OF THE INVENTION

The present invention has been made in view of the foregoing problem and it is an object of the present invention to position a starter motor and balancers in a reasonably manner so that the starter motor and the balancers do not interfere with each other, effectively using the space around an engine.

According to the present invention, an engine with balancers for a vehicle is provided with cylinders set so as to be tilted forward on casings supporting a crankshaft disposed transversely of a body. A rear balancer is disposed in a space behind the cylinders. A front balancer is disposed on the opposite side of the rear balancer with respect to the crankshaft. In the engine, a starter motor is disposed in a space behind the cylinders, the rear balancer and the front balancer are disposed on one side of a plane including the center of gravity of the engine and perpendicular to the crankshaft, and the starter motor is disposed on the other side of the plane.

According to the present invention, the rear balancer and the front balancer comprise balancer shafts extended in parallel to the crankshaft, weights mounted on the balancer shafts at positions close to the plane, and balancer driving mechanisms disposed apart from the plane to transmit the rotation of the crankshaft to the balancer shafts, respectively.

According to the present invention, the rear balancer driving mechanism for driving the rear balancer and the front balanced driving mechanism for driving the front balancer are disposed on a second plane parallel to the plane.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
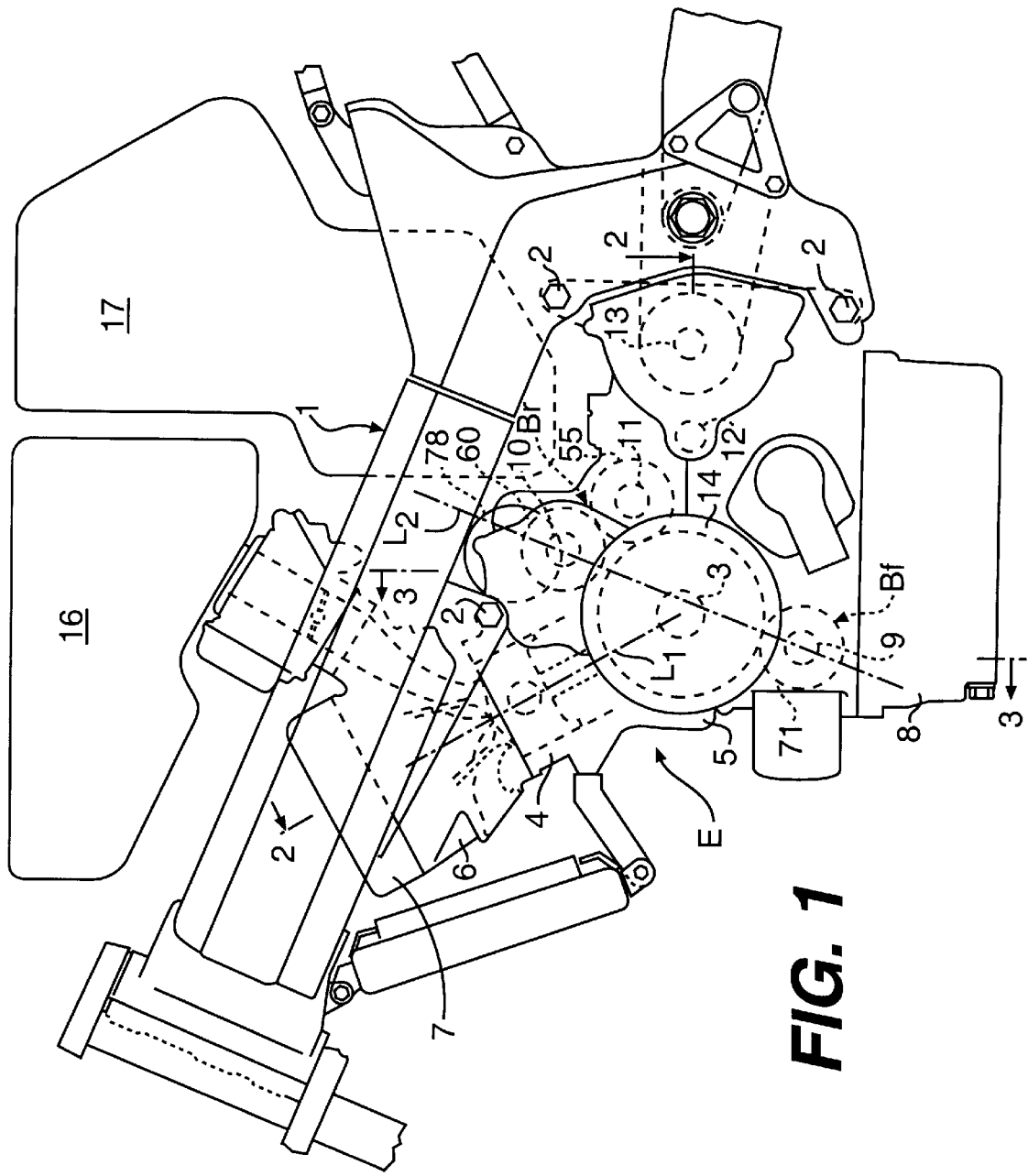
FIG. 1 is a side view of an engine mounted on a motorcycle.
Figure 2:
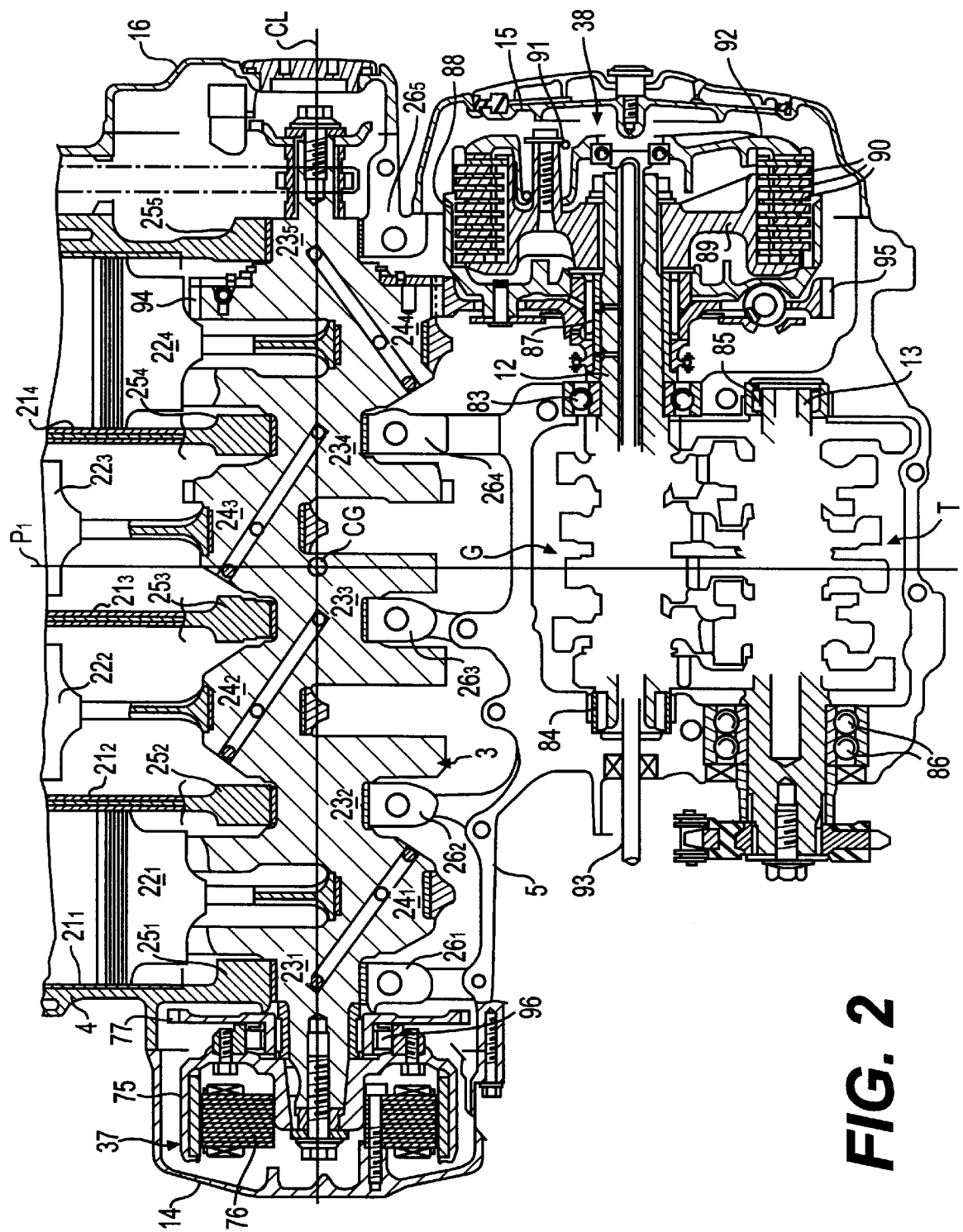
FIG. 2 is a sectional view taken on line 2—2 in FIG. 1.
Figure 3:
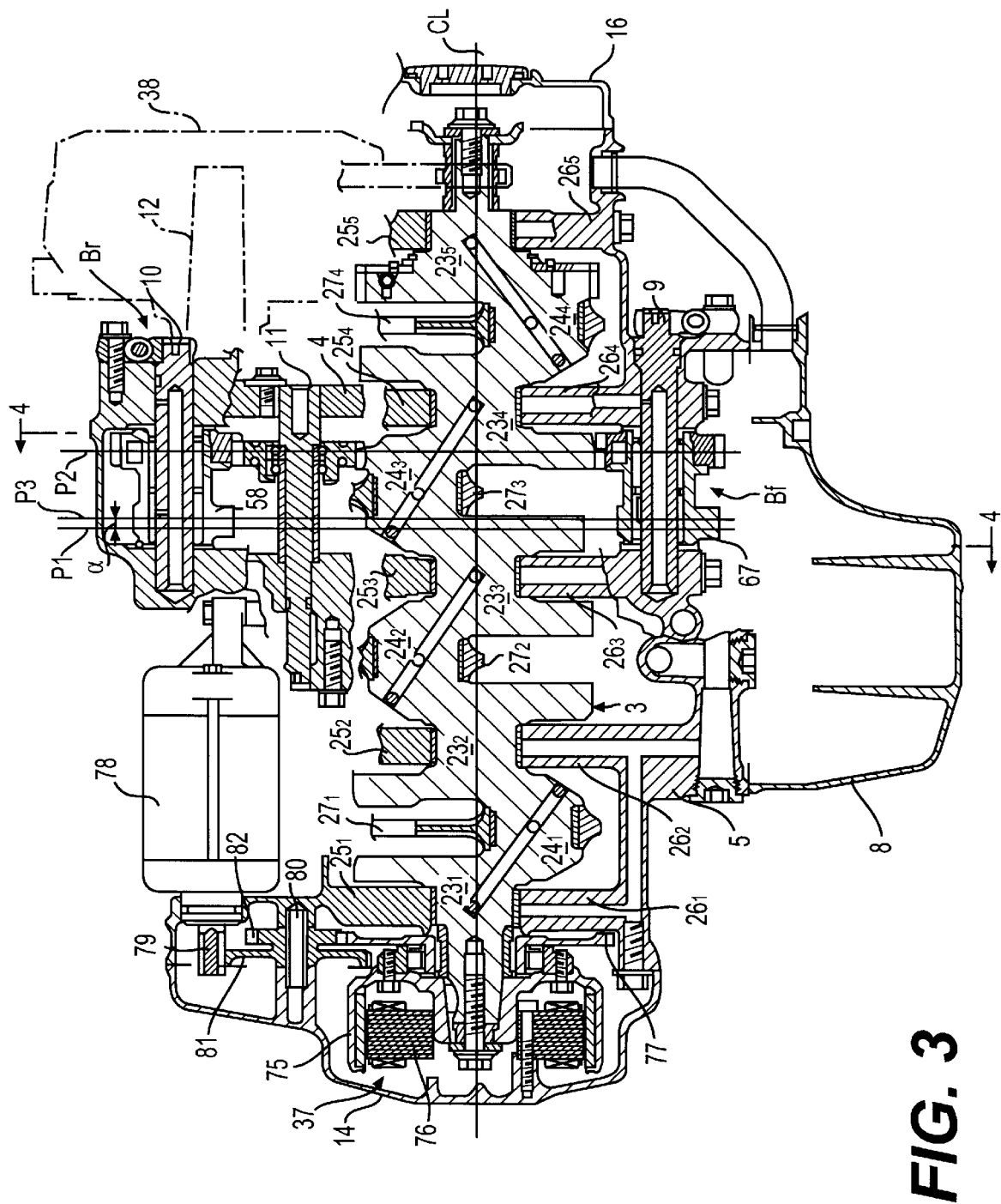
FIG. 3 is a sectional view taken on line 3—3 in FIG. 2.

Referring to FIGS. 1 to 3, a four-cylinder straight engine E is suspended from a body frame 1 of a motorcycle with three bolts 2 with its crankshaft 3 extended transversely of the body frame 1 and with the axes $L_1$ of the cylinders tilted forward from a vertical line. A casing of the engine E comprises an upper casing 4 forming an upper half of a crankcase, an upper half of a transmission case and a cylinder block. A lower casing forms a lower half of the crankcase and a lower half of the transmission case, a cylinder head 6 joined to the upper end of the cylinder block of the upper casing 4, a head cover 7 connected to the upper end of the cylinder head 6, and an oil pan 8 connected to the lower surface of the lower casing 5. An alternator cover 14 is attached to the left side surface of the casing across the joint of the upper casing 4 and the lower casing 5. A clutch cover 15 and a timing chain cover 16 are attached to the right surface of the casing across the joint of the upper casing 4 and the lower casing 5.

The engine E is provided with a secondary balancing mechanism for reducing a secondary vibration. The secondary balancing mechanism has a front balancer Bf and a rear balancer Br. The front balancer Bf has a front balancer shaft 9 disposed below and slightly to the front of the crankshaft 3. The rear balancer Br has a rear balancer shaft 10 disposed above and slightly to the rear of the crankshaft 3, and an idle shaft 11 disposed below and behind the rear balancer shaft 10. The front balancer shaft 9 and the rear balancer shaft 10 are disposed at positions symmetrical with respect to the crankshaft 3. A transmission T contained in rear portions of the upper casing 4 and the lower casing 5 includes a main shaft 12 disposed behind the crankshaft 3, and a counter shaft 13 disposed behind the main shaft 12.

As shown in FIGS. 2 and 3, a first piston $22_1$ to a fourth piston $22_4$ are slidably positioned in a first cylinder $21_1$ to a fourth cylinder $21_4$ formed in the upper casing 4, respectively. The crankshaft 3 has a first journal $23_1$ to a fifth journal $23_5$, and a first crankpin $24_1$ to a fourth crankpin $24_4$ extended between the adjacent ones of the first journal $23_1$ to the fifth journal $23_5$, respectively. The first journal $23_1$ to the fifth journal $23_5$ are supported for rotation between a first upper journal support $25_1$ to a fifth upper journal support $25_5$ formed in the upper casing 4, and a first lower journal support $26_1$ to a fifth lower journal support $26_5$ formed in the lower casing 5, respectively. The first crankpin $24_1$ to the fourth crankpin $24_4$ are connected to the first piston $22_1$ to the fourth piston $22_4$ by a first connecting rod $27_1$ to a fourth connecting rod $27_4$, respectively.

The first lower journal support $26_1$ to the fifth lower journal support $26_5$ of the lower casing 5, and the first upper journal support $25_1$ to the fifth upper journal support $25_5$ of the upper casing 4 are fastened together, respectively, with five front casing fastening bolts 114 disposed in front of the crankshaft 3 and five rear casing fastening bolts 115 disposed behind the crankshaft 3 so that their rigidity is enhanced.

Since the lower casing 5 supporting the front balancer shaft 9 is fastened to the upper casing 4 with the front casing fastening bolts 114 and the rear casing fastening bolts 115 which are constructed of steel having a modulus of longitudinal elasticity (Young's modulus) higher than that of an aluminum alloy forming the lower casing 5, the rigidity of a front balancer supporting portion of the lower casing 5 is enhanced.

The cylinder head 6 is provided with combustion chambers 28 for the cylinders $21_1$ to $21_4$, intake ports $6_1$, exhaust ports $6_2$, intake valves 29 and exhaust valves 30. The intake valves 29 and the exhaust valves 30 are driven by an intake cam shaft 31 and an exhaust cam shaft 32, which are supported on joining surfaces between the cylinder head 6 and cam shaft holders, not shown.

A timing chain chamber 35 is formed on the right end surface of the engine E, a driving sprocket 33 mounted on the right end of the crankshaft 3. A timing chain 34 for transmitting the rotation of the driving sprocket 33 to the intake cam shaft 31 and the exhaust cam shaft 32 are accommodated in the timing chain chamber 35. An opening of the timing chain chamber 35 is covered with the timing chain cover 16.

An alternator 37 has a rotor 75 fixedly mounted on the left end of the crankshaft 3, and a stator 76 supported opposite to the inner circumference of the rotor 75 on the alternator cover 14. A driven starter gear 77 is interlocked with the rotor 75 by a one-way clutch 96. The driven starter gear 77 is interlocked through a first intermediate gear 81 and a second intermediate gear 82 supported on an intermediate shaft 80 with a driving starter pinion 79 driven for rotation by a starter motor 78 (FIG. 1). When the starter motor 78 is actuated, the crankshaft 3 is driven for rotation through the driving starter pinion 79, the first intermediate gear 81, the second intermediate gear 82, the driven starter gear 77, the one-way clutch 96 and the rotor 75 to start the engine E.

The main shaft 12 is supported in a ball bearing 83 and a needle bearing 84 held between the joining surfaces of the upper casing 4 and the lower casing 5. The counter shaft 13 is supported in a needle bearing 85 and a ball bearing 86 held between the same joining surfaces. The main shaft 12 and the counter shaft 13 are interlocked by a transmission gear train G capable of selectively establishing a desired one of a plurality of gear ratios.

A starting clutch 38, mounted on the right end of the main shaft 12 has an outer clutch hub 88 supported on a needle bearing 87 put on the main shaft 12. An inner clutch hub 89 is fixedly mounted on the right end of the main shaft 12. A plurality of friction disks 90 are axially slidably supported on the outer clutch hub 88 and the inner clutch hub 89. A clutch piston 92 is biased so as to engage the friction disks 90 by the resilient forces of springs 91. A clutch release rod 93 axially slidably extended in the main shaft 12 to force the clutch piston 92 to move in a clutch releasing direction against the resilient forces of the springs 91. A drive gear 94 is mounted on a right end weight of the crankshaft 3 and a driven gear 95 is mounted on the outer clutch hub 88.

When the clutch 38 is engaged, the rotation of the crankshaft 3 is transmitted through the drive gear 94, the driven gear 95, the outer clutch hub 88, the friction disks 90 and the inner clutch hub 89 to the main shaft 12.

Figure 4:
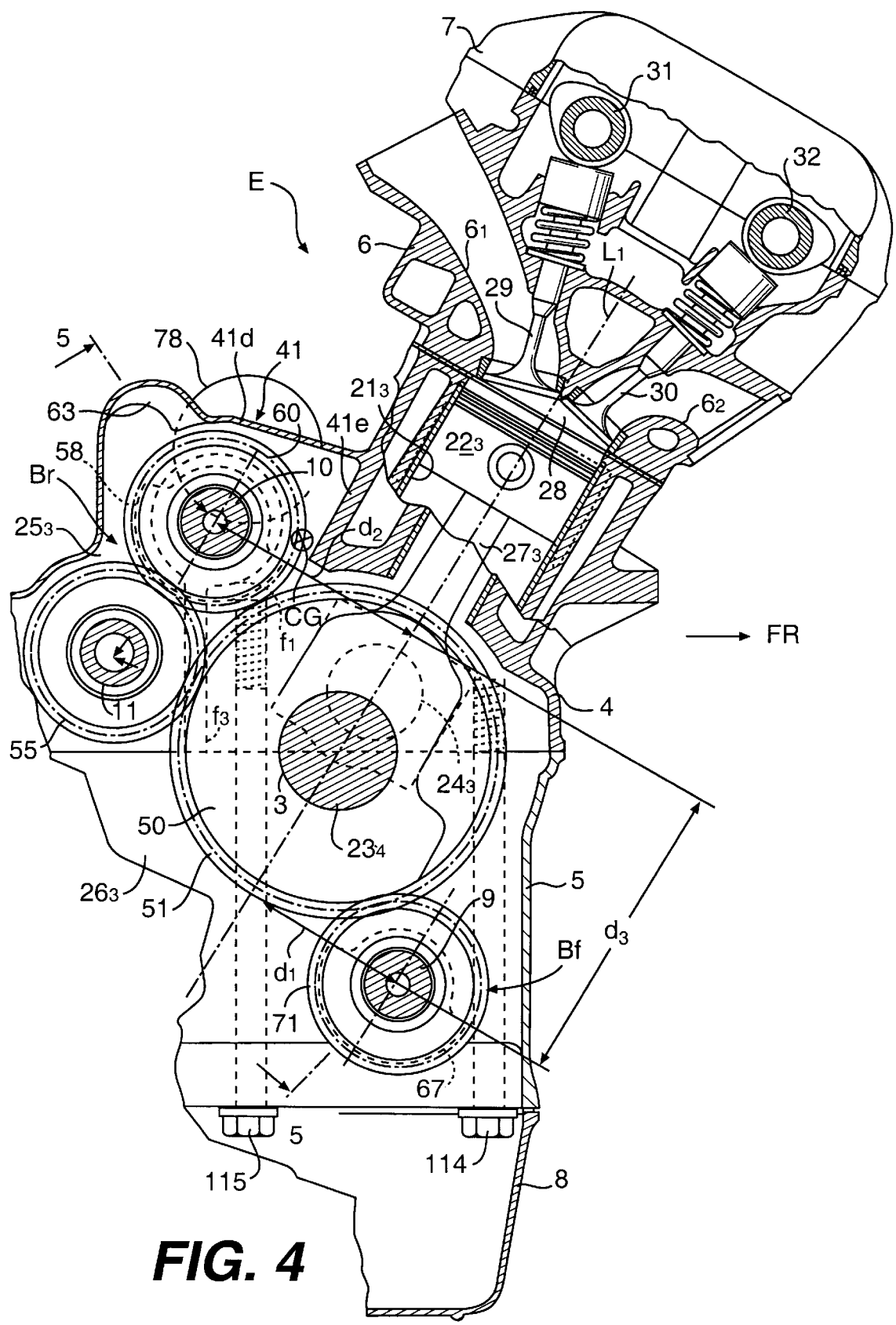
FIG. 4 is a sectional view taken on line 4—4 in FIG. 3.
Figure 5:
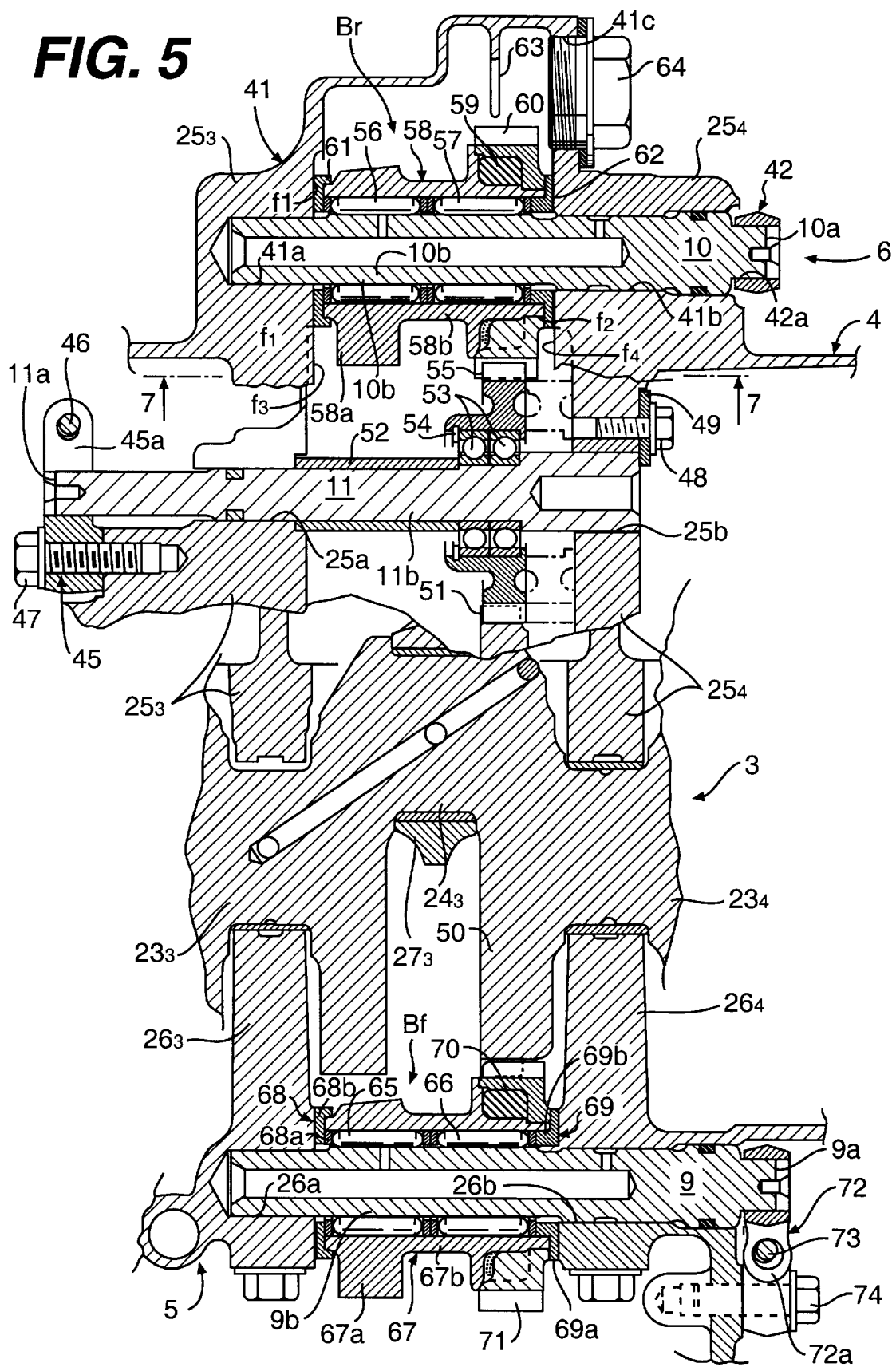
FIG. 5 is a sectional view taken on line 5—5 in FIG. 4.
Figure 6:
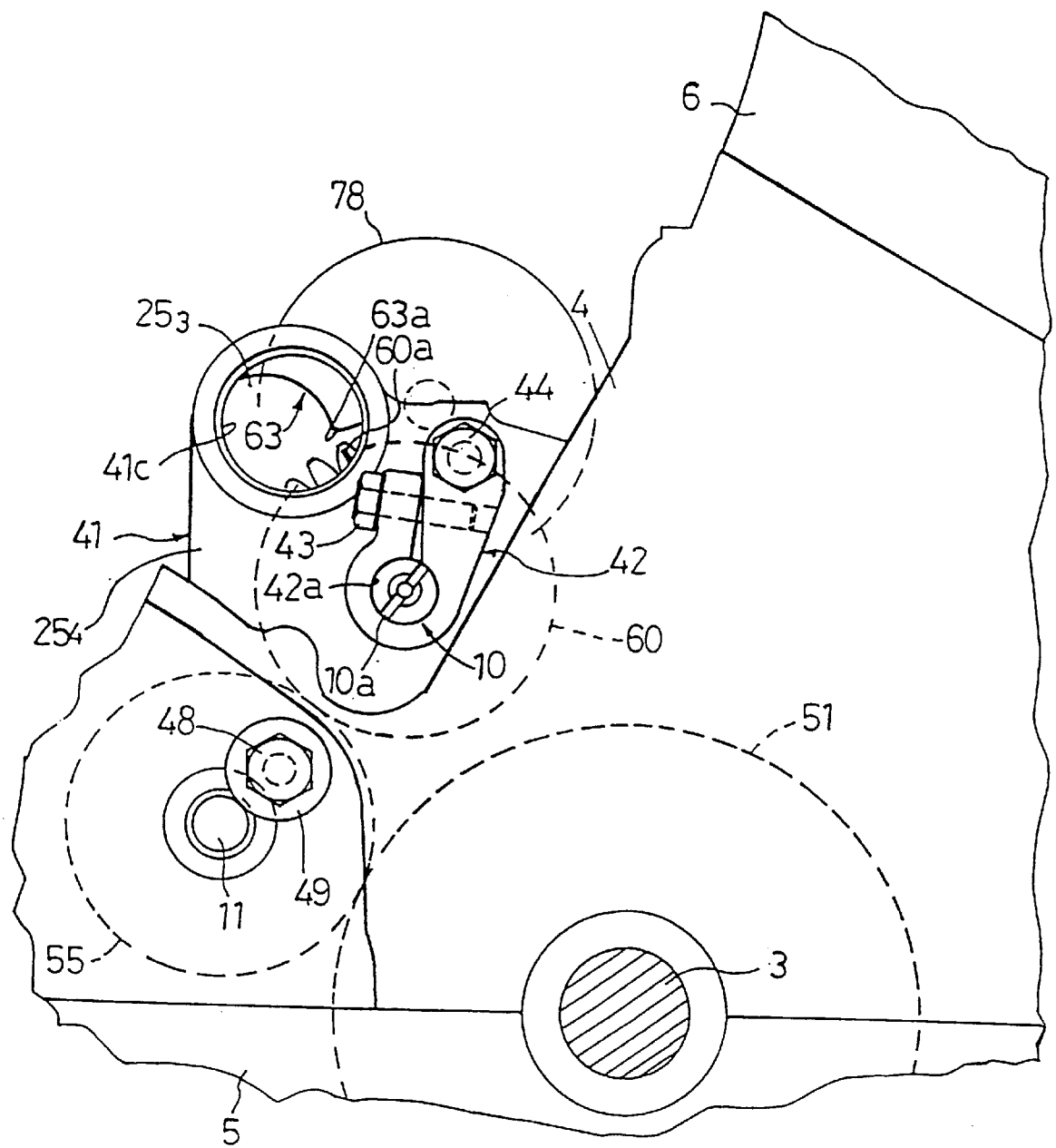
FIG. 6 is a view taken in the direction of the arrow 6 in FIG. 5.

As shown in FIGS. 4 to 6, the idle shaft 11 of the rear balancer Br is supported at opposite ends of the idle shaft 11 on the third upper journal support $25_3$ and the fourth upper journal support $25_4$ formed in the upper casing 4 to support the third journal $23_3$ and the fourth journal $23_4$ of the crankshaft 3. A raised part 41 is formed by extending the third upper journal support $25_3$ and the fourth upper journal support $25_4$ outwardly from an outer wall of the upper casing 4 in a range from the rear surface of the cylinder block to the upper surface of the upper casing 4.

The raised part 41 has an upper wall 41d, i.e., a wall forming an upper portion and a rear portion of the raised part 41. A cylinder side wall 41e extending from the front end of the upper wall 41d so as to form a side wall of the third cylinder $21_3$. The third upper journal support $25_3$, the fourth upper journal support $25_4$, the upper wall 41d and the cylinder side wall 41e form a highly rigid box having a lower open end. The opposite ends of the rear balancer shaft 10 of the rear balancer Br are supported on the third upper journal support $25_3$ and the fourth upper journal support $25_4$ serving as the opposite side walls of the raised part 41.

The rear balancer shaft 10 is inserted through a through hole 41b formed in the fourth upper journal support $25_4$ into a bottomed hole 41a formed in the third upper journal support $25_3$. A fixing member 42 is fastened to an end portion of the rear balancer shaft 10 projecting outwardly from the fourth upper journal support $25_4$. The rear balancer shaft 10 is an eccentric shaft having an eccentric portion 10b. The phase of the eccentric portion 10b can be adjusted by turning the rear balancer shaft 10 engaging a tool with a groove 10a formed in the right end of the rear balancer shaft 10 and turning the rear balancer shaft 10 with the tool. After setting the eccentric portion 10b in a desired phase, the rear balancer shaft 10 is fixed so that the rear balancer shaft 10 is neither able to rotate nor able to move axially by the fixing member 42. The fixing member 42 has a shape substantially resembling the letter J. The right end of the rear balancer shaft 10 is inserted in a split groove 42a of the fixing member 42, the fixing member 42 is fastened to the rear balancer shaft 10 with a bolt 43, and the fixing member 42 is fastened to the fourth upper journal support $25_4$ with a bolt 44.

The idle shaft 11 is inserted through a through hole 25b formed in the fourth upper journal support $25_4$ into a through hole 25a formed in the third upper journal support $25_3$ from the side of the fourth upper journal support $25_4$. A fixing member 45 is fastened to an end of the idle shaft 11 projecting outwardly from the third upper journal support $25_3$ with a bolt 46 and the fixing member 45 is fixed to the third upper journal support $25_3$ with a bolt 47. A washer 49 is fixed to the fourth upper journal support $25_4$ with a bolt 48 and is in contact with the right end of the idle shaft 11 to position the idle shaft 11 with respect to an axial direction. The idle shaft 11 is an eccentric shaft having an eccentric portion 11b. The phase of the eccentric portion 11b can be adjusted before fixing the idle shaft 11 by engaging a tool with a groove 11a formed in the right end of the idle shaft 11 and turning the idle shaft 11 with the tool.

A balancer driving gear 51 is formed in the outer circumference of a balancing weight 50 directly on the left side of the fourth journal $23_4$ of the crankshaft 3. Ball bearings 53 mounted on the eccentric portion 11b of the idle shaft are positioned with respect to an axial direction by a collar 52. An idle gear 55 removably mounted on the ball bearings 53 and kept in place with a retaining ring 54 is engaged with the balancer driving gear 51.

Figure 8:
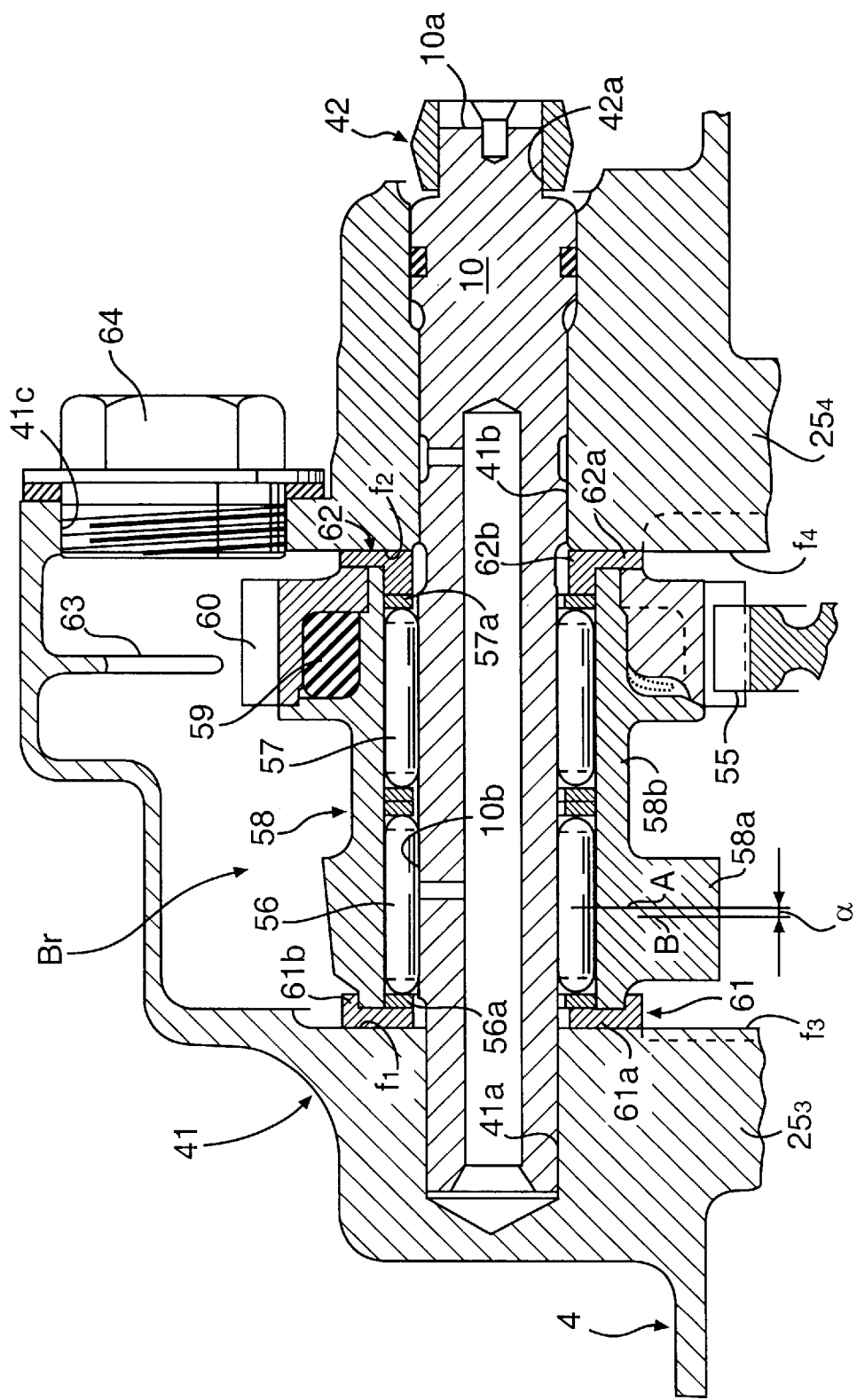
FIG. 8 is an enlarged view of an essential portion in FIG. 5.

Referring to FIG. 8 in combination with FIGS. 4 to 6, a first needle bearing 56 and a second needle bearing 57 are positioned on the eccentric portion 10b of the rear balancer shaft 10, and a rear balancing weight 58 is rotatably supported on the needle bearings 56 and 57. The rear balancing weight 58 has an weight portion 58a and a tubular portion 58b. A plurality of rubber damping blocks 59 are mounted on the tubular portion 58b, and a rear balancer gear 60 is mounted on the rubber damping blocks 59 and is engaged with the idle gear 55. A first thrust washer 61 is interposed between one end of the rear balancing weight 58 and the third upper journal support $25_3$ of the raised part 41, and a second thrust washer 62 is interposed between the other end of the rear balancing weight 58 and the fourth upper journal support part $25_4$ of the raised part 41. The weight portion 58a of the rear-balancing weight 58 is disposed contiguously with the third upper journal support $25_3$ of the raised part 41 to avoid interference between the weight portion 58a and the large end of the third connecting rod $27_3$.

The first thrust washer 61 is interposed between the rear balancing weight 58 and the third upper journal support part $25_3$ of the raised part 41 and has a body portion 61a and an annular holding portion 61b projecting from the outer circumference of the body portion 61a toward the rear balancing weight 58. The left side surface of the body portion 61a bears a thrust applied thereto by a contact surface $f_1$ of the third upper journal support $25_3$, and the right side surface of the body portion 61a bears a thrust applied thereto by the left end of the rear balancing weight 58 and the retainer 56a of the first needle bearing 56. The inner circumference of the annular holding portion 61b is in contact with the outer circumference of the left end portion of the rear balancing weight 58 to position the first thrust washer 61 with respect to a radial direction relative to the rear balancing weight 58.

The second thrust washer 62 is interposed between the fourth upper journal support $25_4$ of the raised part 41 and the rear balancing weight 58 has a flange portion 62a and a tubular portion 62b projecting from the inner circumference of the flange portion 62a toward the rear balancing weight 58. The right side surface of the flange portion 62a bears a thrust applied thereto by the contact surface $f_2$ of the fourth upper journal support $25_4$, the left side surface of the flange portion 62a bears a thrust applied thereto by the right end of the rear balancing weight 58 and the right end of the rear balancer gear 60, and the left end surface of the tubular portion 62b bears a thrust applied thereto by the retainer 57a of the second needle bearing 57. The tubular portion 62b is fitted in a right end portion of the bore of the rear balancing weight 58 to position the second thrust washer 62 with respect to a radial direction relative to the rear balancing weight 58.

As is apparent from the comparison of the respective shapes of the first thrust washer 61 and the second thrust washer 62, the first needle bearing 56 can be positioned near the body portion 61a without being interfered with by the annular holding portion 61b because the annular holding portion 61b of the first thrust washer 61 is formed on the outer circumference of the body portion 61a. Consequently, the first needle bearing 56 can be disposed with a middle line A passing the middle of the width of the first needle bearing 56 extending near a center line B passing the center of gravity of the weight portion 58a of the rear balancing weight 58. Therefore, the distance between the middle line A and the center line B, i.e., the offset α of the first needle bearing 56 relative to the weight portion 58a, can be reduced to the least possible extent. Since the offset load on the first needle bearing 56 can thus be reduced, the first needle bearing 56 may be of a relatively small bearing capacity, and the durability of the first needle bearing 56 can be enhanced.

Figure 7:
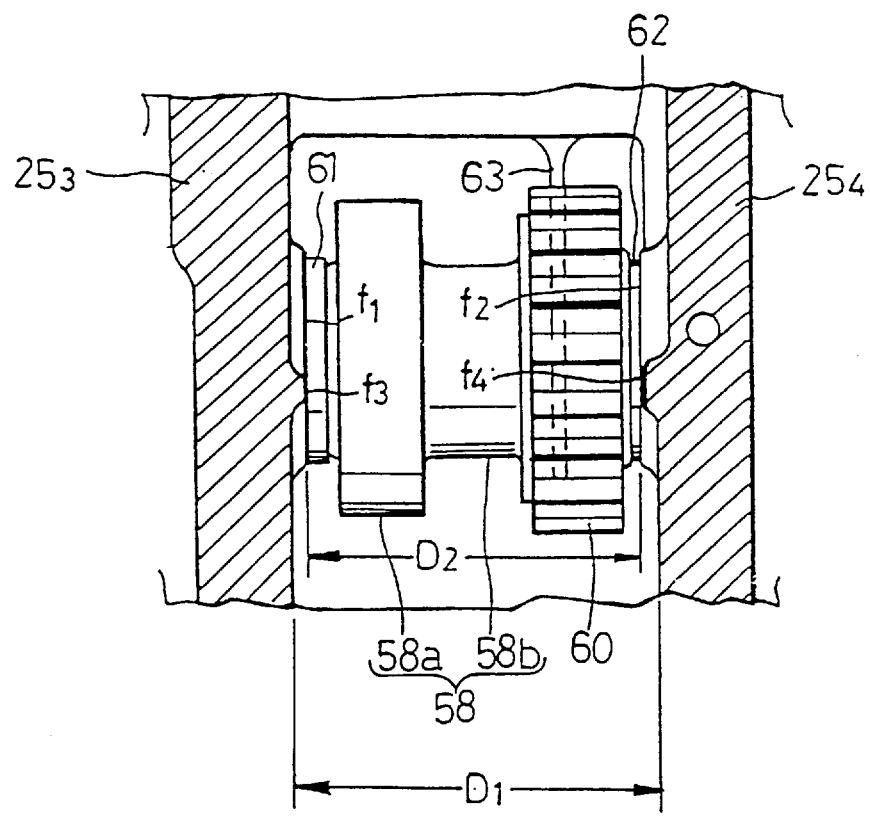
FIG. 7 is a sectional view taken on line 7—7 in FIG. 5.

When installing the rear balancing weight 58 in the raised portion 41, the rear balancing weight 58, the rear balancer gear 60, the rubber damping blocks 59, the first needle bearing 56, the second needle bearing 57, the first thrust washer 61 and the second thrust washer 62 are assembled in a rear balancer subassembly. The rear balancer subassembly of the above components is installed in the raised part 41. When the assembly is installed in place as shown in FIG. 5, the first thrust washer 61 and the second thrust washer 62 are held in contact with the third upper journal support $25_3$ and the fourth upper journal support $25_4$, respectively, to prevent the first thrust washer 61 and the second thrust washer 62 from falling off. However, as shown in FIG. 7, since the distance $D_1$ between the opposite surfaces of the third upper journal support $25_3$ and the fourth upper journal support $25_4$ is greater than the distance $D_2$ between portions of the opposite surfaces of the third upper journal support $25_3$ and the fourth upper journal support $25_4$ corresponding to the rear balanced subassembly as installed in the raised part 41, i.e., the distance between the surfaces $f_1$ and $f_2$, to permit a reduction in the weight, the first thrust washer 61 and the second thrust washer 62 are liable to fall off the rear balancing weight 58 while the rear balancer subassembly is being inserted through the open end of the upper casing 4 in the space in the raised part 41. Thus, the work for installing the rear balancer subassembly in the space in the raised part 41 is difficult. Particularly, since the rear balancer subassembly is installed in the innermost portion of the space in the raised part 41 which is difficult to reach, the installation of the rear balancer subassembly requires difficult work.

To facilitate the work for installing the rear balancer subassembly in this embodiment, thrust washer guide surfaces $f_3$ and $f_4$ are positioned to be continuous with the thrust washer support surfaces $f_1$ and $f_2$ from the opening portion of upper casing 4 and are formed on the opposite surfaces of the third upper journal support $25_3$ and the fourth upper journal support $25_4$ as shown in FIGS. 4, 5 and 7. The left thrust washer guide surface $f_1$ is flush with the thrust washer guide surface $f_3$, and the right thrust washer support surface $f_2$ is flush with the thrust washer guide surface $f_4$. Therefore, the distance between the thrust washer guide surfaces $f_3$ and $f_4$ is equal to the distance $D_2$ between the opposite thrust washer support surfaces $f_1$ and $f_2$.

When installing the rear balancer subassembly including the rear balancing weight 58 at a predetermined position in the space in the raised part 41, the rear balancer subassembly is inserted into the space in the raised part 41 so that the first thrust washer 61 and the second thrust washer 62 slide along the thrust washer guide surfaces $f_3$ and $f_4$, respectively. Thus, the first thrust washer 61 and the second thrust washer 62 will not fall off the rear balancing weight 58 and can be guided to the thrust washer support surfaces $f_1$ and $f_2$ when placing the rear balancer subassembly in the space in the raised part 41 and hence the assembling work is facilitated remarkably.

As is shown in FIGS. 4 to 7, a rib 63 having the shape of a circular arc is formed on the inner surface of the raised part 41, and a circular opening 41c is formed in the fourth upper journal support $25_4$ so that the rib 63 is visible through the opening 41c and the opening 41c is closed with a plug 64 (FIG. 5). A phase adjusting mark 63a formed on the rib 63 and a portion of the rear balancer gear 60 are visible through the opening 41c. The rear balancer gear 60 is turned with a finger inserted through the opening 41c in the raised part 41 to make a phase adjusting mark 60a (FIG. 6) formed on one of the teeth of the rear balancer gear 60 coincide with the phase adjusting mark 63a of the rib 63 to adjust the phase of the rear balancer gear 60 correctly when assembling the rear balancer Br.

When the rear balancer subassembly is inserted in the space of the raised part 41, the rear balancer gear 60 strikes on the rib 63 as shown in FIGS. 4 and 7 for rough positioning. Therefore, the falling of the rear balancing weight 58 onto the bottom of the raised part 41 can be prevented, which facilitates the assembling work.

As shown in FIGS. 4 and 5, the front balancer shaft 9 of the front balancer Bf is extended between the third lower journal support $26_3$ and the fourth lower journal support $26_4$ of the lower casing 5. A first needle bearing 65, a second needle bearing 66, a front balancing weight 67 having an weight portion 67a and a tubular portion 67b, a first thrust washer 68, a second thrust washer 69, rubber damping blocks 70, and a front balancer gear 71 engaged with the balancer driving gear 51 are mounted on the front balancer shaft 9. The front balancer shaft 9 is fastened to the lower casing 5 with a fastening member 72 and bolts 73 and 74.

As shown in FIG. 5, the front balancer Bf and that of the rear balancer Br are symmetrical with respect to the crankshaft 3, except that the front balancer Bf is not provided with any components corresponding to the idle shaft 11 and the idle gear 55. Hence the description of the construction of the front balanced Bf will be omitted to avoid duplication. The front balancer Bf is disposed in the lower casing 5 at a relatively small depth from the open end of the lower casing 5 and is easy to assemble and to adjust its phase because the same does not have any component corresponding to the idle gear 55. Therefore, any surfaces corresponding to the thrust washer guide surfaces $f_3$ and $f_4$ of the rear balancer Br and any portion corresponding to the rib 63 are unnecessary.

The first needle bearing 65 can be positioned near the body portion 68a of a first thrust washer 68 without being interfered with by the annular holding portion 68b of the first thrust washer 68 because the annular holding portion 68b of the first thrust washer 68 is formed on the outer circumference of the body portion 68a of the first thrust washer 68 as shown in FIG. 5. Consequently, the first needle bearing 65 can be disposed with a middle line passing the middle of the width of the first needle bearing 65 extending near the center line of the weight portion 67a of the front balancing weight 67. Therefore, as mentioned above in connection with the description of the rear balancer Br, the offset load on the first needle bearing 65 of the front balancer Bf can be reduced.

The number of teeth of the rear balancer gear 60 and the front balancer gear 71 are half the number of teeth of the balancer driving gear 51 mounted on the crankshaft 3. Therefore the rear balancer gear 60 rotates at a rotating speed twice that of the crankshaft 3 in the same direction as that in which the crankshaft 3 rotates, and the front balancer gear 71 rotates at a rotating speed twice that of the crankshaft 3 in a direction opposite the direction in which the crankshaft 3 rotates, whereby, as is generally known, the secondary vibration of the engine E is reduced.

Referring to FIG. 4, it is desirable to dispose the front balancer shaft 9 and the rear balancer shaft 10 symmetrically with respect to the crankshaft 3 to reduce the vibrations of the engine E effectively. It is desirable that the distance $d_1$ between the axis $L_1$ of the cylinder and the axis of the front balancer shaft 9 is equal to the distance $d_2$ between the axis $L_1$ of the cylinder and the axis of the rear balancer shaft 10, and the distance $d_3$ along the axis $L_1$ of the cylinder between the respective axes of the front balancer shaft 9 and the rear balancer shaft 10 is substantially equal to the effective length of each of the connecting rods $27_1$ to $27_4$.

The foregoing conditions can relatively easily be satisfied by positioning the front balancer shaft 9 at a position on the front side and below the crankshaft 3 and disposing the rear balancer shaft 10 at a position on the back side and above the crankshaft 3. Since a space behind the cylinders $21_1$ to $21_4$ are tilted forward and are used for arranging various accessories, such as the starter motor 78 shown in FIG. 1, an air cleaner 16 and a fuel tank 17, it is possible that the rear balancer shaft 10 interferes with those accessories. However, in this embodiment, the interference between the rear balancer shaft 10 and the accessories can be avoided because the rear balancer shaft 10 is disposed in the raised part 41 and is of a minimum size formed on the upper surface of the upper casing 4 to secure the largest possible space available for arranging the accessories therein. Since the idle shaft 11 is disposed behind the rear balancer shaft 10, a large space can be secured behind the cylinders $21_1$ to $21_4$.

As shown in FIG. 5, the rear balancer shaft 10 is supported on the third upper journal support $25_3$ and the fourth upper journal support $25_4$ of the upper casing 4 supporting the crankshaft 3 at the third journal $23_3$ and the fourth journal $23_4$. The front balancer shaft 9 is supported on the third lower journal support $26_3$ and the fourth lower journal support 264 supporting the crankshaft 3 at the third journal $23_3$ and the fourth journal $23_4$. If the balancer shafts 9 and 10 are supported on the outer walls of the casings 4 and 5, the casings 4 and 5 need to be reinforced to withstand centrifugal forces which act on the balancer shafts 9 and 10, and the weight of the casings 4 and 5 is increased. However, since the balancer shafts 9 and 10 are supported on the journal supports $25_3$, $25_4$, $26_3$ and $26_4$ having a high rigidity to support the crankshaft 3, the casings 4 and 5 need not be reinforced and may be formed to be a lightweight construction.

The upper journal supports $25_1$ to $25_5$ of the upper casing 4 and the lower journal supports $26_1$ to $26_5$ of the lower casing 5 are fastened together with the front fastening bolts 114 and the rear fastening bolts 115 of a steel having a modulus of longitudinal elasticity (Young's 25 modulus) higher than that of an aluminum alloy forming the upper casing 4. Thus, the rigidity of a structure formed by fastening together the casings 4 and 5 is enhanced. Therefore, the rigidity of the front balanced shaft 9 and the rear balancer shaft 10 which are supported on the structure are enhanced. Accordingly, the vibrational forces of the front balanced shaft 9 and the rear balancer shaft 10 (damping force for suppressing the vibration of the crankshaft 3) act effectively to suppress the vibration of the engine E to the least extent. Particularly, since the rear balancer shaft 10 is supported on the raised part 41 having the shape of a box having an open lower end and the rear balancer support is near the rear fastening bolts 15, a desired rigidity can be secured.

In FIG. 3, an axis CL of the crankshaft 3 and a first plane $P_1$ which includes the center of gravity CG of the engine E which is perpendicular to the axis CL are illustrated. In this embodiment, the first plane $P_1$ is positioned between the third journal $23_3$ and the third crankpin $24_3$ of the crankshaft 3. Although the center of gravity CG is marked on the axis CL in FIGS. 2 and 3 for convenience sake, actually, the center of gravity CG is at a distance disposed upwardly from the axis CL as shown in FIG. 4.

The rear balancer Br and the front balancer Bf are disposed on the right side of the first plane $P_1$ including the center of gravity CG of the engine E, and the starter motor 78 is disposed on the left side of the plane $P_1$. The weight portion 58a of the rear balancing weight 58 and the weight portion 67a of the front balancing weight 67 are on a third plane $P_3$ perpendicular to the axis CL and at a short distance a to the right from the first plane $P_1$. The rear balancer driving mechanism including the balancer driving gear 51, the idle gear 55 and the rear balancer gear 60 for driving the rear balancer Br, and a front balancer driving mechanism including the balancer driving gear 51 and the front balancer gear 71 for driving the front balancer Bf are disposed on a second plane $P_2$ perpendicular to the axis CL and at a relatively long distance to the right beyond the third plane P3 from the first plane $P_1$.

A great transversely unbalanced distribution of the weight of the engine E is avoided because the rear balancer Br and the front balancer Bf are disposed on the right side of the first plane $P_1$ which is perpendicular to the axis CL and includes the center of gravity CG of the engine E and the starter motor 78 is disposed on the left side of the first plane $P_1$. Since the weight portion 58a of the rear balancing weight 58 and the weight portion 67a of the front balancing weight 67 are on the third plane $P_3$ adjacent to the first plane $P_1$, the dislocation of the weight portions 58a and 67a from the center of gravity CG in the direction of the axis CL can be limited to the least extent to prevent coupling vibrations.

Since both the rear balancer driving mechanism for driving the rear balancer Br and the front balancer driving mechanism for driving the front balancer Bf are disposed on the second plane $P_2$, the balancer driving gear 51 of the crankshaft 3 can be used for driving both the rear balancer Br and the front balancer Bf, which simplifies the construction of the balancer driving system and reduces the dimension of the engine E along the axis CL.

As shown in FIGS. 2 and 3, the alternator 37 associated with the left end of the crankshaft 3 is at a relatively long distance from the first plane $P_1$ including the center of gravity CG, while the clutch 38 associated with the right end of the main shaft 12 of the transmission T is at a relatively short distance from the first plane $P_1$. Therefore, the distribution of the weight of the engine E with respect to the center of gravity CG is liable to be unbalanced. However, since the rear balancer Br and the front balancer Bf are disposed on the right side of the first plane $P_1$, i.e., on the side of the clutch 38, the weight of the alternator 37 on the left side of the first plane $P_1$ can be balanced by the total weight of the clutch 38, the rear balancer Br and the front balancer Bf, which are disposed on the right side of the first plane $P_1$. Therefore, the weight of the right portion of the engine E and that of the left portion of the engine E are properly balanced.

A method of incorporating the rear balancer Br and the front balancer Bf into the engine E and a method eliminating backlash will be described hereinafter.

When mounting the rear balancer Br on the engine E, the upper casing 4 is held with its open end facing up, the rear balancing weight 58, the rear balancer gear 60, the rubber damping blocks 59, the first needle bearing 56, the second needle bearing 57, the first thrust washer 61 and the second thrust washer 62 are assembled temporarily in a rear balancer subassembly, and then the rear balancer subassembly is inserted in the raised part 41 so that the first thrust washer 61 and the second thrust washer 62 slide along the thrust washer guide surfaces $f_3$ and $f_4$. Then, the rear balanced shaft 10 is inserted through the through hole 41b formed in the fourth upper journal support $25_4$ and through the rear balancer subassembly in the bottomed hole 41a formed in the third upper journal support $25_3$.

The idle gear 55 provided with the ball bearings 53 in its bore is put in the upper casing 4 so as to be engaged with the rear balancer gear 60, the idle shaft 11 is inserted through the through hole 25b formed in the fourth upper journal support $25_4$ into a through hole 25a formed in the third upper journal support $25_3$ so as to extend through the ball bearings 53 and the collar 52. When thus inserting the idle shaft 11, the idle gear 55 is maintained in a retracted position indicated by alternate long and two short dashes lines in FIG. 5, during which the idle gear 55 and the rear balancer gear 60 are partly engaged.

The rear balancer gear 60 is turned with a finger inserted through the opening 41c in the raised part 41 to make a phase adjusting mark 60a formed on one of the teeth of the rear balancer gear 60 which coincides with the phase adjusting mark 63a of the rib 63. In this state, the journals $23_1$ to $23_5$ of the crankshaft 3 are positioned in the upper journal supports $25_1$ to $25_5$ of the upper casing 4. Since the idle gear 55 is maintained in the retracted position indicated by alternate long and two short dashes lines, the balancer driving gear 51 of the crankshaft 3 is not engaged with the idle gear 55. Subsequently, the crankshaft 3 is turned to set, for example, the first crankpin $24_1$ and the fourth crank pin $24_4$ at positions corresponding to the top dead center, then the idle gear 55 is shifted to a working position indicted by the continuous lines in FIG. 5 to engage the same with the balancer driving gear 51, and then the idle shaft 11 is fixed in the through hole 25a. Thus, the rear balancer gear 60 can be set in an appropriate phase relative to the phase of the crankshaft 3.

When incorporating the front balancer Bf into the engine E, the front balancer shaft 9 and the front balancing weight 67 are put on the lower casing 5 with the front balancer gear 71 set in a predetermined phase. Then the lower casing 5 is joined to the upper casing 4 and is temporarily fixed to support the crankshaft 3 in a predetermined phase. The front balanced Bf can easily be installed in the lower casing 5 because the same is disposed at a position at a relatively small depth from the open end of the lower casing 5.

Figure 9A:
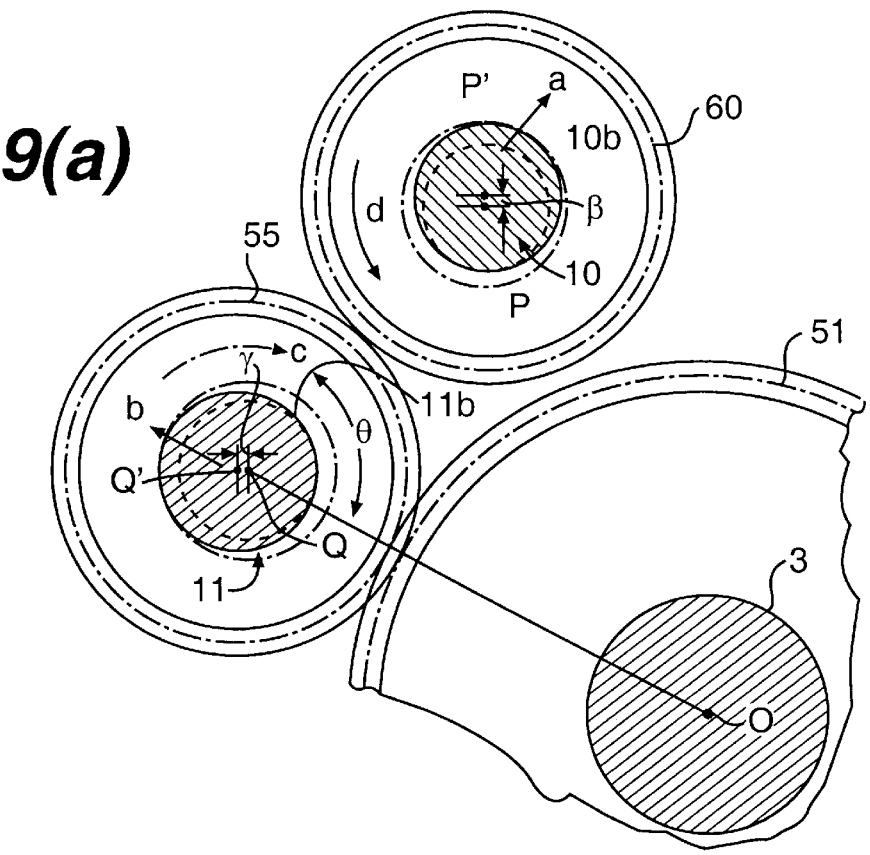
FIGS. 9(A) and 9(B) are diagrammatic views of assistance in explaining actions.

The backlash in the rear balancer Br can be adjusted by adjusting the angular positions of the rear balancer shaft 10 and the idle shaft 11, which are eccentric shafts. As shown in FIG. 9(A), the axis P' of the eccentric portion 10b mounted with the first needle bearing 56 and the second needle bearing 57 is displaced by an eccentricity β from the axis P of the opposite end portions of the rear balancer shaft 10 supported on the third upper journal support $25_3$ and the fourth upper journal support $25_4$ of the raised part 41. The axis Q' of the eccentric portion 11b supporting the idle gear 55 is displaced by an eccentricity γ from the axis Q of the opposite end portions of the idle shaft 11 supported on the third upper journal support $25_3$ and the fourth upper journal support part $25_4$ of the upper casing 4. The angle θ between line segments QO and QP is about 90°. Indicated at O is the axis of the crankshaft 3.

First, the eccentric portion 10b (a shaded circle in FIG. 9(A)) is displaced from the axis P in the direction of the arrow a in a substantially parallel direction to the line segment QP and is temporarily fixed at that position. The eccentric portion 11b (a shaded circle in FIG. 9(A)) of the idle shaft 11 is displaced from the axis Q in the direction of the arrow b in a substantially parallel direction to the line segment OQ and is temporarily fixed at the position. In this state, the rear balancer gear 60 and the idle gear 55 are in loose engagement, and the idle gear 55 and the balancer driving gear 51 are in loose engagement.

Then, the idle shaft 11 is turned through a predetermined angle of, for example, about 120°, in the direction of the arrow c (FIG. 9(A)) and is fixed at that angular position. Consequently, the axis Q' of the eccentric portion 11$b$ of the idle shaft 11 moves in the direction of the arrow e (FIG. 9(B)) toward the crankshaft 3, whereby the backlash between the balancer driving gear 51 and the idle gear 55 is adjusted properly. Although the distance between the idle gear 55 and the rear balancer gear 60 is reduced slightly when the backlash between the balanced driving gear 51 and the idle gear 55 is adjusted, the idle gear 55 can be smoothly moved in the direction of the arrow e because the idle gear 55 and the rear balancer gear 60 are in loose engagement.

Figure 9B:
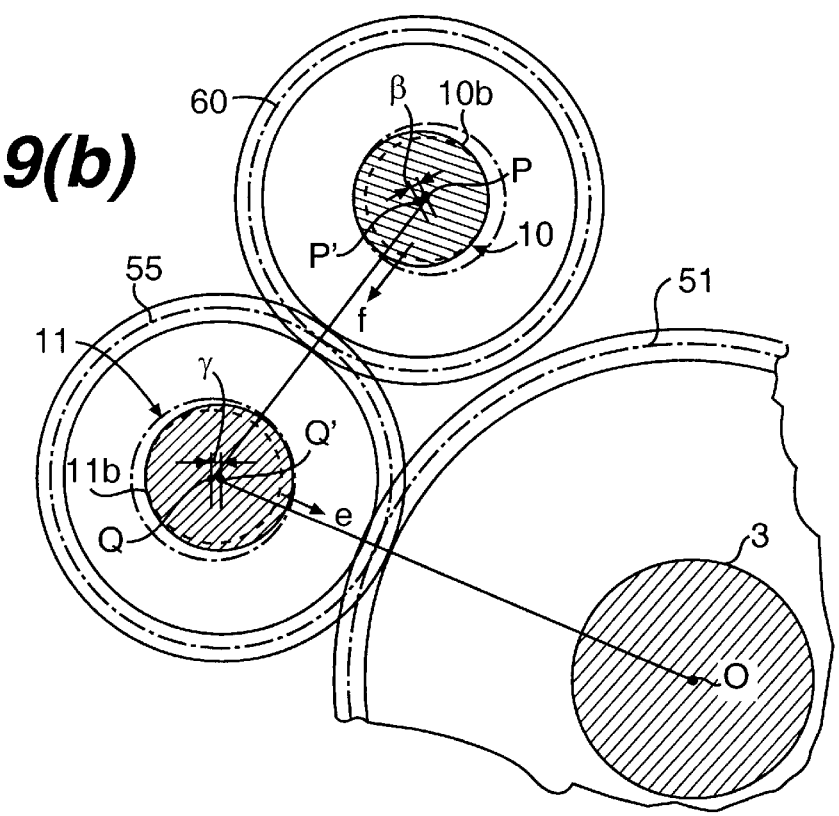

After thus adjusting the backlash between the balancer driving gear 51 and the idle gear 55, the rear balancer shaft 10 is turned in the direction of the arrow d (FIG. 9(A)) through a predetermined angle of, for example, about 90° and is fixed at that angular position, whereby the rear balancer gear 60 is moved in the direction of the arrow f (FIG. 9(B)) and the backlash between the rear balancer gear 60 and the idle gear 55 is adjusted properly. Since the distance between the idle gear 55 and the rear balancer gear 60 is reduced slightly when adjusting the backlash between the balancer driving gear 51 and the idle gear 55, a distance by which the rear balancing gear 60 must be moved in the direction of the arrow f is reduced accordingly. Naturally, the previously adjusted backlash between the balancer driving gear 51 and the idle gear 55 is not affected by the movement of the rear balancer gear 60 in the direction of the arrow f.

The backlash in the front balancer Bf can easily be achieved by turning the front balancer shaft 9 having the eccentric portion 9$b$. Since the axis of the eccentric portion 9$b$ supporting the front balancer gear 71 is displaced by a predetermined eccentricity from the axis of the opposite ends of the front balancer shaft 9 supported on the third lower journal support 26$_3$ and the fourth lower journal support 26$_4$ of the lower casing 5, the front balancer gear 71 is moved toward or away from the balancer driving gear 51 of the crankshaft 3 for backlash adjustment when the front balanced shaft 9 is turned.

Although the present invention has been described in its preferred embodiment, various changes may be made in the design of the embodiment without departing from the scope of the present invention.

According to the present invention, since the rear balancer and the starter motor are disposed in the space behind the cylinders and are set so as to be tilted forward on the casings supporting a crankshaft in a transverse position, the space behind the cylinders can be effectively used. Since the balancers are disposed on one side of the plane including the center of gravity of the engine and perpendicular to the crankshaft, and the starter motor is disposed on the other side of the same plane, the weight of the right portion of the engine and that of the left portion of the engine are properly balanced.

According to the present invention, since the weight portions are disposed close to the plane including the center of gravity of the engine and perpendicular to the crankshaft, the generation of coupling vibrations by the balancers is limited to the least extent to enhance the vibration preventing effect. Since the balancer driving mechanisms for driving the balancers is separated from the foregoing plane, the weight of starter motor can be balanced by the weight of the driving mechanism to balance the weight of the right portion and the left portion of the engine properly.

According to the present invention, since the rear balancer driving mechanism for driving the rear balancer and the front balanced driving mechanism for driving the front balancer are disposed on the second plane parallel to the foregoing plane, both the balancers can be driven by simple mechanisms and the engine can be formed in a construction having a relatively small transverse dimension.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine with balancers comprising:

a casing for supporting a crankshaft disposed transversely within said casing;

cylinders positioned to be tilted forward on the casing;

a rear balancer disposed in a space behind said cylinders; and a front balancer disposed on an opposite side of said rear balancer with respect to said crankshaft;

wherein a starter motor is disposed in a space behind said cylinders;

said rear balancer and said front balancer are disposed on one side of a plane including the center of gravity of an engine and perpendicular to said crankshaft; and said starter motor is disposed on the other side of said plane.

2. The engine with balancers according to claim 1, wherein said rear balancer and said front balancer comprise balancer shafts extend substantially parallel to said crankshaft, weight portions mounted on said balancer shafts at positions close to said plane, and balancer driving mechanisms disposed apart from said plane to transmit the rotation of said crankshaft to said balancer shafts, respectively.

3. The engine with balancers according to claim 1, wherein said rear balancer driving mechanism for driving said rear balancer and said front balancer driving mechanism for driving said front balancer are disposed on a second plane parallel to said plane.

4. The engine with balancers according to claim 1, and further including needle bearings for supporting said front balancer for rotation relative to said casing.

5. The engine with balancers according to claim 1, and further including needle bearings for supporting said rear balancer for rotation relative to said casing.

6. The engine with balancers according to claim 1, and further including a front balancer gear having a plurality of gear teeth and being mounted on said front balancer wherein said plurality of gear teeth mesh with a drive gear for rotating said front balancer in a reverse direction and at twice the rotational speed relative to said crank shaft.

7. The engine with balancers according to claim 1, and further including a rear balancer gear having a plurality of gear teeth and being mounted on said rear balancer wherein said plurality of gear teeth mesh with a drive gear for rotating said rear balancer in a direction of rotation of said crank shaft and at twice the rotational speed relative to said crank shaft.

8. The engine with balancers according to claim 1, wherein said front balancer is disposed ahead of and beneath the crank shaft.

9. The engine with balancers according to claim 1, wherein said rear balancer is disposed behind and above the crank shaft.

* * * * *